United States Patent [19]

Fink

[11] Patent Number: 5,011,609

[45] Date of Patent: Apr. 30, 1991

[54] ULTRASORB SYSTEM

[76] Inventor: Ronald G. Fink, 191 Commodore Dr., Jupiter, Fla. 33477

[21] Appl. No.: 357,004

[22] Filed: May 25, 1989

Related U.S. Application Data

[62] Division of Ser. No. 144,412, Jan. 15, 1988, Pat. No. 4,859,329.

[51] Int. Cl.⁵ .................................................. C02F 9/00
[52] U.S. Cl. ..................................... 210/665; 210/668; 210/669; 210/787; 210/799; 210/806
[58] Field of Search ............... 210/663, 665, 668, 669, 210/799, 804–806, DIG. 5, 787, 788

[56] References Cited

U.S. PATENT DOCUMENTS

| | | | |
|---|---|---|---|
| 4,104,164 | 8/1978 | Chelton | 210/257.1 |
| 4,427,551 | 1/1984 | Duveau | 210/258 |
| 4,676,908 | 6/1987 | Ciepiela et al. | 210/669 |

Primary Examiner—Ivars Cintins
Attorney, Agent, or Firm—Malin, Haley, McHale DiMaggio & Crosby

[57] ABSTRACT

The disclosure pertains to an oil decontamination and water recycling system which is designed to prevent oil, grease, and fuel contamination of ground or surface water and to return the clean water in a single pass for reuse. Water contamination results from pressure or steam cleaning of grit, scale, oil, grease and fuel contaminated equipment. The system is a closed loop separation, filtration and absorption system which removes these contaminants and most other petroleum products. The free oils are discharged to a holding barrel and the solids are removed from the settlement tank and drained off from the centrifugal separator. The petroleum based contaminants such as oil, grease and fuel are absorbed mechanically by a cartridge filter for easy disposal.

4 Claims, 2 Drawing Sheets

ULTRASORB SYSTEM

This application is a division of application Ser. No. 07/144,412, filed Jan. 15, 1988, now U.S. Pat. No. 4,859,329.

BACKGROUND OF THE INVENTION

The contamination of water by oil, grease, fuel and combinations thereof is a significant problem in the U.S. Throughout the country there are establishments such as service stations, automatic repair shops, car washes, pressure cleaning of heavy construction equipment shops and a host of other types of establishments that generate contaminated water as a result of their cleaning processes. The contamination of water sewage systems and street drainage systems due to the careless and/or irresponsible discharge of contaminated waters is a major concern of the Environmental Protection Agency, state and local environmental agencies.

Management should keep the following facts in mind when dealing with possible petroleum contamination of ground or water.

It is illegal to discharge oil, grease or fuel into U.S. waterways and ground water.

The unacceptable amount is—any amount which produces a sheen on the water surface.

Waste oil presently under consideration and considered likely to be added to the "Hazardous Waste List."

Discharging oil waste to the ground has caused ground water contamination, resulting in contamination of local wells and water supplies, resulting in law suits, fines and cease operation orders.

Companies have been fined to the point of bankruptcy.

The "corporate veil" does not relieve corporate officers from personal liability suits when willful negligence is involved.

When oil, grease or fuel contamination of waste water exceeds permissible levels, the contaminants must be removed before discharge is safe and legal. There are numerous known methods of removing oil, grease and fuel available on the open market. However, they all possess disadvantages which exceed their advantages. Below are listed several known systems and showing of the advantages and disadvantages of each.

GRAVITY—Relies on the ability of oil to float to the water surface and is then skimmed off.

Advantages: Inexpensive, easy to use, no moving parts.
Disadvantages:
  Requires frequent attention
  Will not work under pressure or heavy flow
  Will not remove light or emulsified oil
  Poor efficiency levels above 100 ppm COALESCING/GRAVITY—Relies on the ability of oil to float to the water surface. The coalescing function works on the principle that oil is attracted to teflon or polypropylene. Small oil particles attach to the teflon or polypropylene and form oil globules which break away and rise to the surface faster for skimming.

Advantages:
  Easy to operate
  No moving parts
  Units are smaller than gravity systems
Disadvantages:
  Requires frequent attention
  Poor efficiency levels above 50 ppm
  Will not work under pressure or heavy flow
  Will not remove light or emulsified oil METALLIC ATTRACTION—This system is generally made up of a metal belt which runs through the oily water. The free oil is attracted to the metal belt which rotates out of the water. The oil is then scraped off by a scraper blade and drained into a slop tank.

Advantages:
  Simple to use
  Inexpensive
Disadvantages:
  Requires an electric motor
  Will not work under pressure or heavy flow
  Will not remove light or mechanically emulsified oil
  Poor efficiency
  Requires electricity POLYPROPYLENE ATTRACTION—This is a simple method which uses the oil attracting properties of polypropylene. A series of polypropylene fins and baffles are placed in the waste water flow. The heavy oils are attracted to the polypropylene, which can be removed and cleaned.

Advantages:
  Small in size
  Will work under pressure
Disadvantages:
  Very poor efficiency levels above 100 ppm
  Very difficult to clean
  Will not remove light or emulsified oil
  Will not work in heavy flows CHEMICAL TREATMENT—This system treats the waste-water with coagulation, flocculation and polymers and alum which promotes the oil to settle or float in a floc, making removal easier.

Advantages:
  Good efficiency levels below 10 ppm
  Will work under pressure
  Will work on light and emulsified oil
Disadvantages:
  Requires daily servicing by trained technicians
  Units are expensive
  Operates on a batch system, not a continuous flow
  Requires electricity BACTERIA TREATMENT—A new technology that uses bacteria to alter the composition of oil.

Advantages:
  Excellent efficiency below 10 ppm
  Will work on emulsified oils
  Will work under pressure
Disadvantages:
  Possible side effects of bacteria problem
  Requires a trained technician to operate
  Expensive to operate
  Requires electricity ULTRAFILTRATION—Uses ultrafine membranes to filter out oil and contaminants.

Advantages:
  Excellent efficiency less than 10 ppm
  Will work under pressure
  Will work on light or emulsified oil
Disadvantages:
  Very expensive to operate and purchase initially
  Large in size
  Operates on a batch system, not a continuous flow
  Requires electricity CENTRIFUGAL—Uses centrifugal force to separate liquids and solids of different specific gravity.

As can be seen from the above tabulation, there are many known systems, each having their own advantages and disadvantages with no one system possessing all the advantages of the instant invention as will be set forth hereinafter.

SUMMARY OF THE INVENTION

The system of the present invention includes utilizing the latest technology. The system will operate on most petroleum products, including: motor oil, transmission oil, hydraulic oil, vegetable oil, acetone, gasoline, diesel fuel, grease, bunker-C, toluene, lard oil, kerosene, transformer oil, turpentine, etc. The system is delivered pre-piped, pre-wired and pre-tested. It is skid-mounted and readily portable. The automatic control system allows unattended operation for fast, single-pass processing permitting the recycling as clean water.

Further advantages of the system includes: a minimum amount of maintenance, approximately three hours per month; eliminates potential liability for environmental damage; saves water; meets tightening standards for the discharge of oil wastes; the automatic control system allows unattended operation; provides a cleaner, healthier work environment resulting in fewer employee complaints and absenteeism; the system's unique construction is practically maintenance free due to the use of fiberglass and stainless steel components.

OBJECTS OF THE INVENTION

An object of the invention is to provide a method and system of water decontamination which removes approximately ninety nine percent of the water from oily waste water.

A further object of the invention is the provision of a system which can be retailed as separate units depending upon user requirements.

A still further object of the invention is the provision of a system which requires a minimum amount of maintenance.

Yet another object of the invention is to provide a system which reduces potential liability for environmental damage.

Another object of the invention is to provide a multi-stage process wherein both solids and free oils, grease and other oil products are effectively removed from the water.

A further object of the invention is to provide a decontamination system which meets discharge standards for oil wastes.

Yet another object of the invention is the provision of a system which provides a cleaner, healthier work environment resulting in fewer employee complaints.

Yet another object of the invention is to provide a system which is skid mounted and thus readily portable.

These and other objects of the instant invention will become more apparent hereinafter, the invention will now be described with particular reference to the accompanying drawings which form a part of this specification wherein like reference characters designate the correspond parts in several views.

DESCRIPTION OF THE PREFERRED EMBODIMENT

Figure 1:
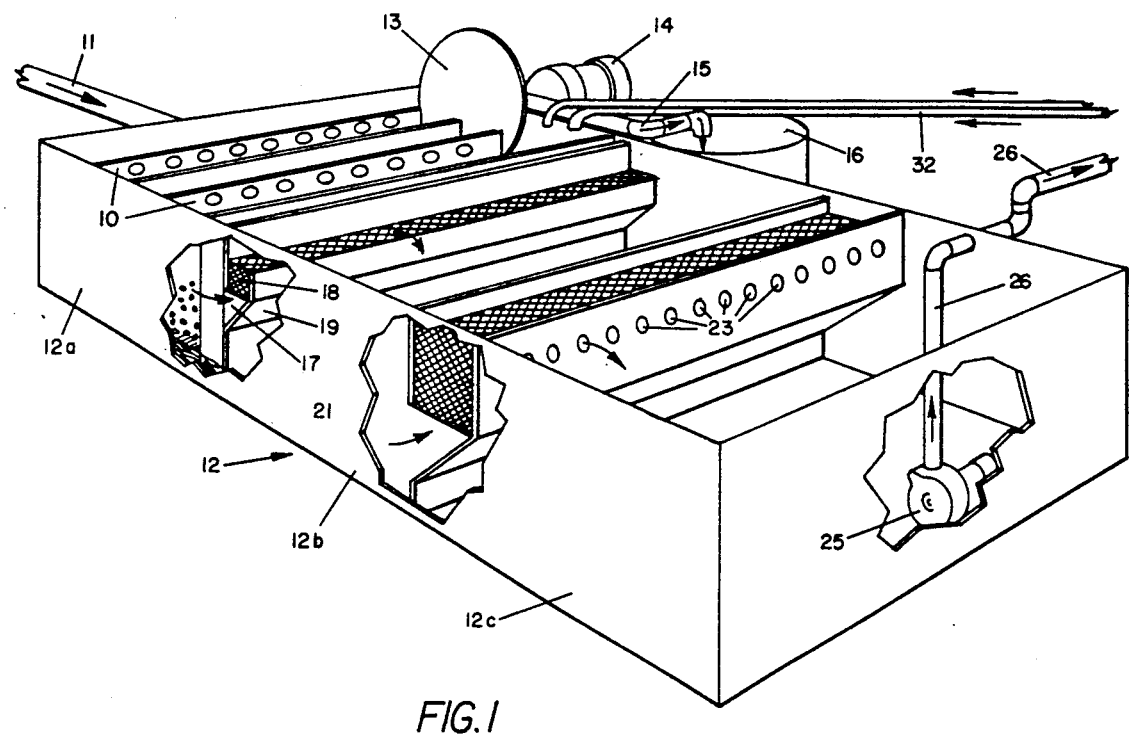
FIG. 1 is a perspective view illustrating phase I or the first half of the decontaminating system.

Referring initially to FIG. 1, there is shown phase I of the two phase system. Contaminated water is drained by gravity via line 11 from a wash pad area (not shown). Line 11 discharges into fiberglass settling tank 12 which is usually buried below the surface of the earth. Tank 12 is basically a three compartment tank 12a, 12b and 12c. In the first compartment 12a of settling tank 12 the heavy solids in the water are permitted to settle and fall to the bottom of the tank compartment 12a. Free oils, grease and fuels float to the surface of the water. Mechanically emulsified oil products are coalesced using a matrix of polypropylene baffles. In the coalescing matrix, oil product globules down to 20 microns are attached to the baffles 10. The globules are held on the baffles 10 until additional globules attach, thereby increasing their size and buoyancy and then they float to the surface for removal by the aluminum oil wheel 13 which is driven by motor 14. The aluminum oil wheel 13 is slowly rotated in the drain water whereby heavy oil attaches to the rotating wheel 13. A scraper device (not shown) scrapes off the heavy oil particles which are drained via line 15 into collecting tank 16. Up to 8 gph (gallons per hour) of oil products can be removed in the compartment 12a which serves as a heavy solids settling tank.

The flow of contaminated water is then gravity-forced into compartment 12b. Partially cleaned water first passes through a metallic coalescing grid 17 and a solids separation grid 18. Free solids are attracted to fine aluminum fibers in the solids separation grid 18 where they build up with the attracted oil globules which may have escaped the polypropylene baffles 10 in compartment 12a. The built up oil globules float to the surface of compartment 12b (stabilization tank) and the built up solids fall back down the angled wall 19 to the bottom of compartment 12a (settling tank). Compartment 12b (stabilization tank) is designed to reduce the flow and collect free oil that escaped the first compartment 12a. A floating absorption cartridge 21 captures any tramp oil before gravity forces the flow up through the disposable cartridge 21. This cartridge 21 will absorb up to 15 gallons of oil products before saturation.

The flow is now directed by gravity through ports 23 designed to reduce flow turbulence to a minimum. The final stage of phase I is the processed water storage compartment 12c where a submersible pump 25 directs the water through pipe 26 to phase II for complete processing. Although not shown for clarity purposes, tank 12 is provided with a removable cover. Light users may only need phase I to obtain satisfactory results. However, most users will need phase II to meet EPA discharge requirements or to properly clean water for reuse.

Figure 2:
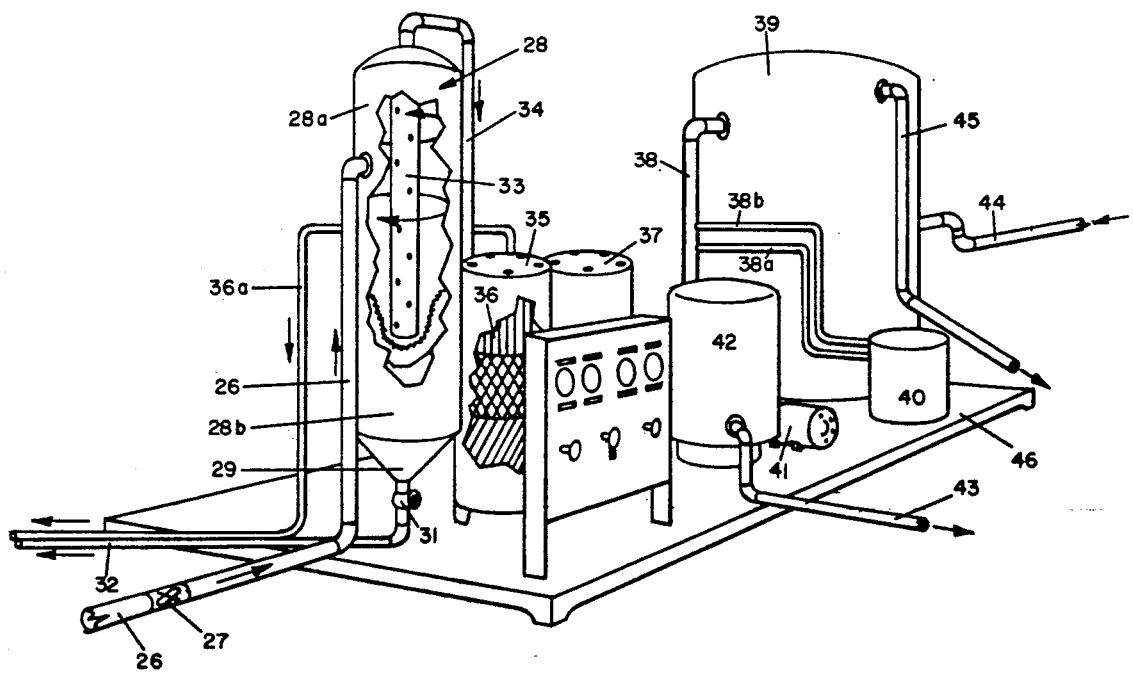
FIG. 2 is a perspective view illustrating phase II where the discharge from phase I is further cleansed prior to storage.
Figure 3:
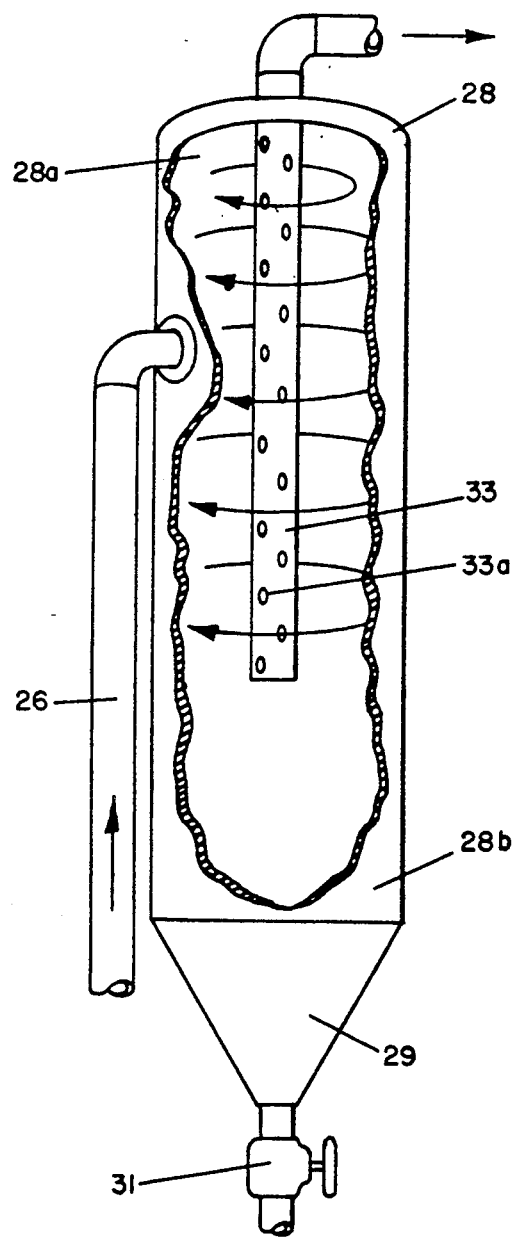
FIG. 3 is an enlarged view of the coalescing centrifugal separator with its outer wall partially removed.

FIG. 2 is a detailed showing of the flow of water as it is further cleaned in phase II. All of the components discussed hereinafter are skid mounted for portability. Line 26 receives the discharge of submersible pump 25 then passes through a check valve 27 and continues through line 26 and enters the upper end portion 28a of the coalescing centrifugal separator 28. The discharge from line 26 directs the water into the separator 28 at the proper angle whereby a swirling motion is imparted to the water and its velocity is increased sufficiently to create a centrifugal force. This forces solids in the low micron range to the outer perimeter and down a funnel 29 which is located in the lower portion 28b of separator 28.

Periodically, the low micron solids which have collected in funnel 29 can be drained by way of valve 31 and drain line 32 back to the settling tank 12a. Oil product globules in the low micron range are centrifugally coalesced to larger globules and collect on a centrally located perforated polypropylene pipe 33. Thus, it can be seen that the coalescing centrifugal separator is designed for both mechanically emulsified oils and solid removal.

The polypropylene pipe 33 is provided with perforations 33a and open at the bottom. The upper end is connected to line 34 which leads to absorption filter 35. The filter 35, has a removable cartridge 36, and is provided with pressure gauges to assist in determining when the cartridge needs replacing. The removable cartridge 36 is made up of polyisocyanurate, polypropylene, teflon, treated fibers and minerals. Cartridge 36 absorbs oil and will not absorb water. Line 35a returns free oil to settling tank 12a. After passing through the cartridge 36 oil product contamination should be below 10 ppm. Water leaving the absorption cartridge filter 36 is then directed into a polish filter 37 where any remaining solids are removed. From filter 37 the clean water is directed via line 38 into storage tank 39. Two tap off lines 38a and 38b are interconnected with line 38 and chlorinator 40 to provide a constant feed of chlorine to prolong water life and lower bacteria build-up. A jet pump 41 takes suction from storage tank 39 and discharges into pressure tank 42. Line 43 from pressure tank 42 leads back to the point of use i.e. the pressure cleaner (not shown). Storage tank 39 is provided with a make-up water line 44 which is used to replace water loss due to evaporation. An overflow system 45 is provided to relieve excess water pressure due to heavy rains. This last mentioned feature is important to users that have located their wash pad area in an open area, usually a concrete floor with appropriate drains connected to line 11. Water discharged from overflow line 45 should be below 10 ppm and therefore acceptable for discharge.

The above described system is a closed loop separation, filtration and absorption system which effectively removes grit, dirt, scale, oil, grease, fuel and most other petroleum products. As pointed out earlier, the portability of this system lends itself to many other uses, beyond those specifically set forth.

While the invention has been described in its preferred embodiments, it is to be understood that words which have been used are words of description rather than limitation and that changes may be made within the purview of the append claims without departing from the full scope or spirit of the invention.

Having thus described my invention, I claim:

1. A method of decontaminating water in a closed loop system, said water containing oil, grease, grit and fuel in the form of heavy solids, smaller solids, free oil, emulsified oil, and large oil globules, said method comprising the steps of:
   (a) separating the heavy solids from the water;
   (b) coalescing the emulsified oil products;
   (c) absorbing free oil by an absorption cartridge;
   (d) coalescing oil product globules and separating solids in the low micron range;
   (e) absorbing the large oil globules with a mechanical filter;
   whereby water having a greatly reduced oil, grease, grit and fuel levels is produced, thereby producing a semi-decontaminated water, said method further comprising the steps of:
   (f) further filtering said semi-decontaminated water to remove any remaining contaminants; and,
   (g) injecting chemicals from a chemical feed system into said semi-decontaminated water to prolong water life and lower bacteria build-up.

2. A method of decontaminating water as defined in claim 1 wherein (a), the step of separating and removing the heavy solids from the water includes the step of rotating a disk which is partially immersed in said water and scraping off the oil particles which have been attracted to said rotating disk by mechanical means.

3. A method of decontaminating water as defined in claim 2 wherein (b) the step of coalescing the emulsified oil products includes the step of passing said water through a plurality of polypropylene baffles which attract oil globules and hold them until other globules attach thereto then release and float to the surface of the water for removal by said rotating disk.

4. A method of decontaminating water as defined in claim 1 wherein (d) the step of coalescing oil product globules and separating solids in the low micron range includes the step of introducing said water into a coalescing centrifugal separator at the proper angle to impart a swirling motion to said water.

* * * * *